J. BERG.
INSTRUMENT BOARD.
APPLICATION FILED APR. 21, 1917.
1,273,449.
Patented July 23, 1918.
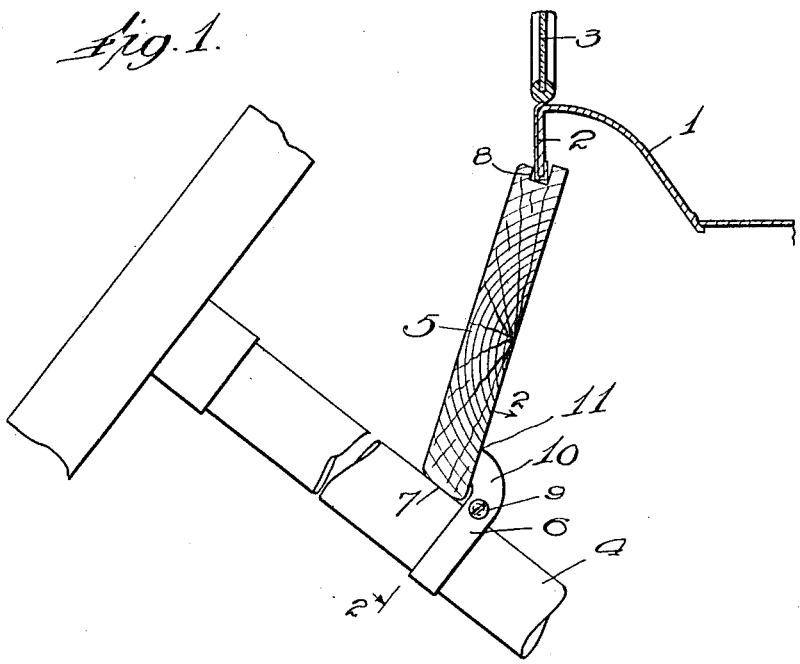
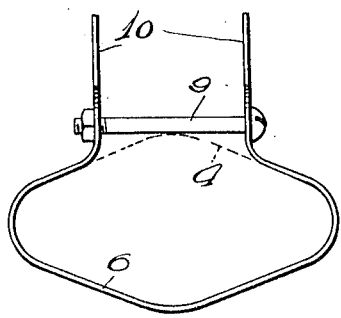

UNITED STATES PATENT OFFICE.

JOSEPH BERG, OF CHICAGO, ILLINOIS, ASSIGNOR TO STEWART-WARNER SPEEDOMETER CORPORATION, OF CHICAGO, ILLINOIS, A CORPORATION OF VIRGINIA.

INSTRUMENT-BOARD.

1,273,449.

Specification of Letters Patent.

Patented July 23, 1918.

Application filed April 21, 1917. Serial No. 163,560.

*To all whom it may concern:*

Be it known that I, JOSEPH BERG, a citizen of the United States, residing at Chicago, in the county of Cook and the State of Illinois, have invented certain new and useful Improvements in Instrument-Boards, of which the following is a specification, reference being had to the accompanying drawings, forming a part thereof.

The purpose of this invention is to provide an inexpensive form of instrument board which may be quickly installed in a vehicle body without any special skill or special tools. It consists in the features and elements of construction described and shown in the drawings as indicated by the claims.

In the drawings:—

Figure 1 is a vertical section taken through an instrument board embodying this invention and indicating the manner of installation in a vehicle by showing also in section a portion of the so-called "cowl" of the dash and a portion of the steering column.

Fig. 2 is a transverse section taken as indicated at line, 2—2, on Fig. 1 for showing more fully the shape of the clip member which serves to retain the board in position.

In a vehicle body to which this instrument board is applicable, the cowl, 1, of the dash construction is formed with a downwardly-extending flange or lip, 2, which happens to be in substantially the same vertical plane as the wind shield indicated at 3. The cowl, 1, overhangs the inclined steering column, 4, as is quite usual in modern pleasure vehicle constructions, and the instrument board, 5, embodying this invention is adapted to be held in place between the flange, 2, of the cowl, 1, and the steering column, 4, without the use of other securing means than these two parts except for a clip member, 6, which is arranged to be clamped at any desired position on the steering column, 4, to prevent the lower edge, 7, of the instrument board, 5, from slipping out of place.

From the foregoing it will be understood that the installation of the board, 5, is readily accomplished by first positioning it in a substantially vertical plane with its upper grooved edge, 8, engaging the downwardly-directed flange, 2, of the cowl, 1, and then swinging the board into oblique position so that its lower edge, 7, comes first into contact with the steering column, 4, and then by a slight further swinging movement wedges said column out of its normal position just enough so that reaction of the column against the lower edge of the board will hold the latter firmly in position. No additional securement would probably be necessary if the board were arranged to meet the column substantially at right angles, but since this would incline the instrument board, 5, more than is desirable, it is preferably dimensioned so as to form an acute angle with the upper side of the steering column, 4, as shown in Fig. 1, and to insure retention of the board, 5, in this position, the clip, 6, is provided encircling the column, 4, and clamped thereto by a clamp, 9, with lugs, 10, extending for engagement with the under side, 11, of the board, 5. Since the clip, 6, can be adjusted at any desired position in the length of the steering column, 4, it will serve to compensate for variations which may be found to exist in different vehicles of the same make with respect to the distance between the edge of the flange, 2, and the upper surface of the column, 4. Owing to the slight stress created in the column by bending it a little out of its normal line, the board, 5, serves to check the vibration of the column which is often excessive in vehicles where it is supported only at its extreme lower end near the floor of the car.

I claim:

1. In a vehicle body in combination with an inclined steering column and a cowl overhanging the same, a rigid member dimensioned for insertion between said cowl and column, and positioned to stress the latter away from the cowl, and a stop member adjustably carried on the column for engaging the under side of the rigid member adjacent the column to retain the parts in stressed relation.

2. In a vehicle body in combination with an inclined steering column and a cowl overhanging the same, a member dimensioned for insertion between said cowl and column, and positioned to form an acute angle between its upper face and the column axis, and a stop member adjustably carried on the column for engaging the under side of the first mentioned member adjacent the column to retain said parts in stressed relation.

110

3. In a vehicle body in combination with an inclined steering column and a cowl overhanging the same, a member dimensioned for insertion between said cowl and column, and positioned to form an acute angle between its upper face and the column axis, and a band encircling the column and adjustably clamped thereon with a lug projecting transversely to stop the lower part of said inserted member against sliding downwardly along the column.

4. In a vehicle body in combination with an inclined steering column and a cowl overhanging the same having a depending flange, an instrument board provided with a grooved upper edge adapted to engage said upper flange, said board being dimensioned for insertion between said flange and said column, and positioned to form an acute angle between its upper face and the column axis, and a band encircling the column adjustably clamped thereon with a lug projecting transversely to engage the under face of the instrument board to stop the latter against sliding downwardly along the column.

In testimony whereof, I have hereunto set my hand at Chicago, Illinois, this 17th day of April, 1917.

JOSEPH BERG.

Copies of this patent may be obtained for five cents each, by addressing the "Commissioner of Patents, Washington, D. C."